Figure 1:
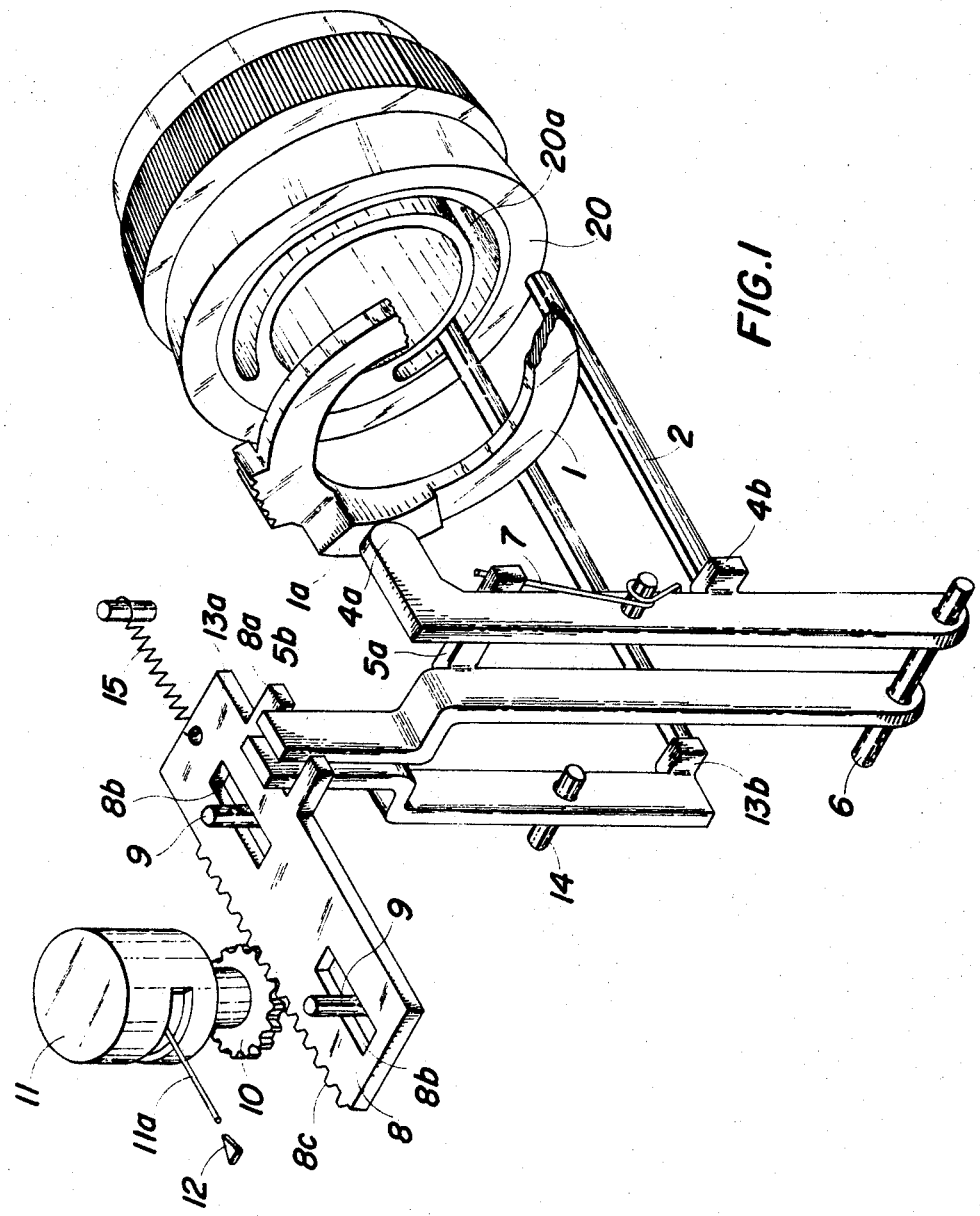

July 30, 1968 H. ETTISCHER 3,394,644
CAMERA WITH INTERCHANGEABLE LENSES
Filed Dec. 3, 1965 2 Sheets-Sheet 1

HELMUT ETTISCHER
INVENTOR.

BY

ATTORNEYS

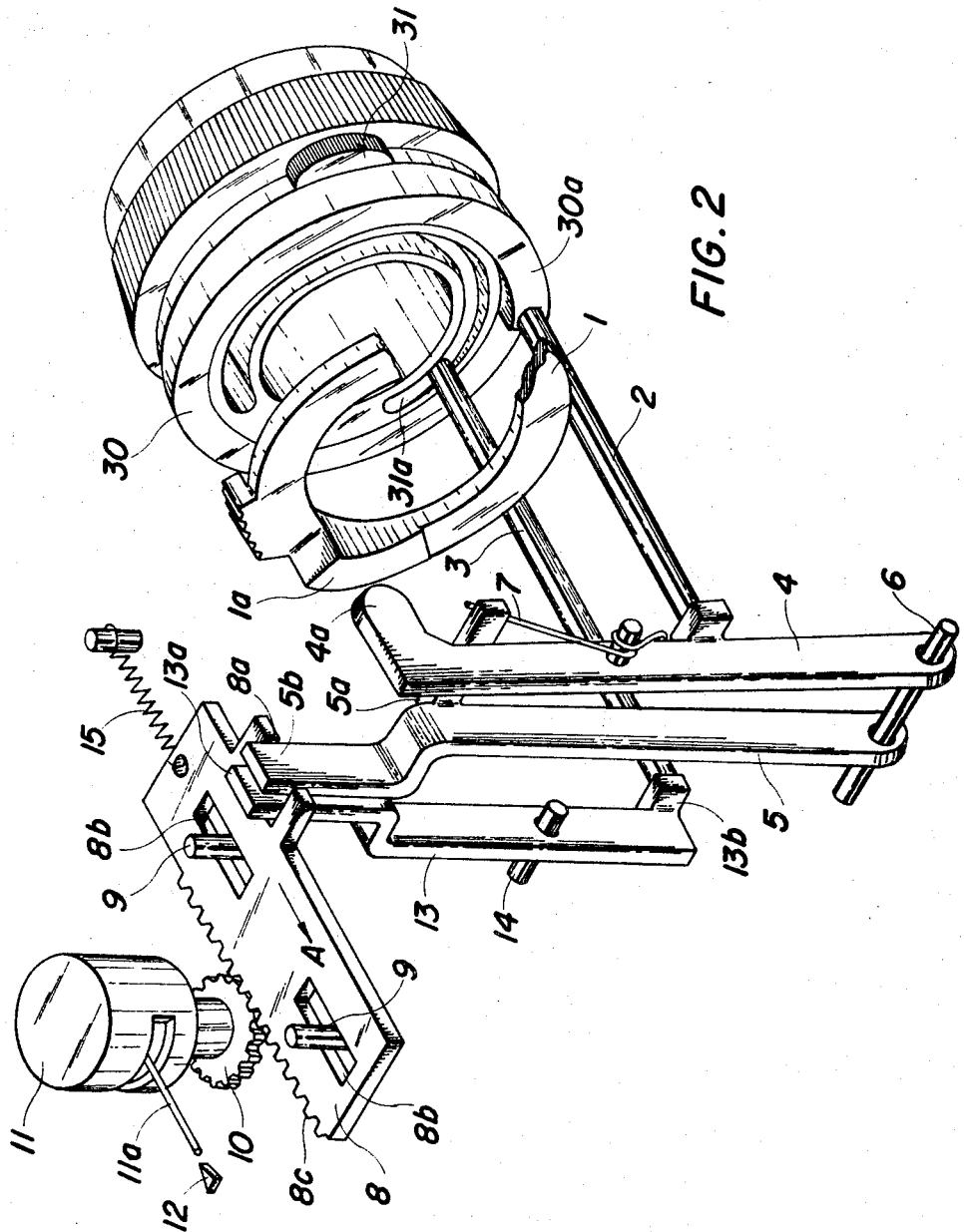

United States Patent Office 3,394,644
Patented July 30, 1968

3,394,644
CAMERA WITH INTERCHANGEABLE LENSES
Helmut Ettischer, Stuttgart-Wangen, Germany, assignor to Eastman Kodak Company, Rochester, N.Y., a corporation of New Jersey
Filed Dec. 3, 1965, Ser. No. 511,493
7 Claims. (Cl. 95—64)

This invention relates generally to photographic cameras adapted to receive interchangeable lens units, and more particularly to cameras having exposure control means adapted for use with various types of interchangeable lenses.

Many known cameras which include automatic or semi-automatic (matching pointer) type exposure control systems are designed for use with interchangeable lens units. Such cameras are often equipped with diaphragm setting or pre-setting members disposed within the camera housing and coupled directly or indirectly to measuring instruments responsive, through means well known in the art, to incident scene illumination. Such cameras generally include coupling means responsive to cams, abutments, recesses, etc., in or on the various interchangeable lens units, the coupling means cooperating with the camera's automatic exposure control system to alter the range of auto-match exposure settings in accordance with the capabilities of the various lens units.

However, some interchangeable lens units (particularly those having lens systems of very long focal length) are provided with a separate diaphragm means within the lens unit itself. Such separate lens unit diaphragms have not been integrated with the camera's automatic exposure control system, except in special cameras having no diaphragm means. These latter camera-lens unit combinations are quite expensive, since each lens unit must contain its own diaphragm means.

Therefore, the invention herein, an improvement over such cameras, provides a simple and inexpensive coupling which interconnects the camera's exposure control system with lens units having separate diaphragm means as well as with lens units not having such separate diaphragm means.

According to the invention herein, the camera housing includes diaphragm means adjustable by a setting member which is positioned in accordance with scene brightness. This diaphragm setting member functions whenever the camera is fitted with a lens unit which does not include a separate diaphragm means. However, when a lens unit including its own diaphragm means is attached to the camera, means coupling the lens unit and the camera function to disable the interconnection between the camera's diaphragm setting member and the exposure control mechanism and, at the same time, interconnect the lens unit diaphragm setting member with the exposure control mechanism. Consequently, the camera's exposure control system is effective for both lens units with and without separate diaphragm means.

An object of the invention is to provide simple and inexpensive means for interconnecting a camera and interchangeable lens units.

A further object is to provide an exposure control system responsive to lens units of different focal lengths and to lens units with or without separate diaphragm means.

Other objects and advantages will become apparent during the following description given with relation to the drawings of which:

FIGURE 1 illustrates in perspective a preferred embodiment of the invention including an interchangeable lens unit having no separate diaphragm means; only those camera parts essential to an understanding of the invention being included to facilitate clarity of presentation; and FIGURE 2 shows in perspective the same structure illustrated in FIGURE 1, but in combination with an interchangeable lens unit having separate diaphragm means.

Referring to FIGURE 1, a diaphragm setting member 1 is located within the camera housing adjacent an interchangeable lens unit 20. Lever arms 4 and 5 are rotatably supported about axle 6, lever arm 4 moving in response to the position of follow-up member 4a which rides on cam 1a.

Lever 5 is spring biased to lever 4 through follower 5a and spring 7. End 5b of lever 5 is in engagement with recess 8a of toothed rack 8 which is guided for translational movement by pins 9. Toothed portion 8c is adapted to mesh with wheel 10 connected to measuring instrument 11, and bias spring 15 is provided to eliminate play within the meshing teeth of rack 8. Pointer 11a of measuring instrument 11 is deflected as a function of scene brightness, in the manner well known in the art.

When the camera operator moves diaphragm setting member 1, the lever system just described above causes the rotation of instrument 11, and its pointer 11a is moved until it is aligned with index mark 12, indicating that the diaphragm has been adjusted to the proper setting in accordance with the prevailing intensity of scene illumination.

Lever 13 is adapted to be rotated about axle 14 as its extension 13a is displaced by moving rack 8. Rods 2 and 3 which, respectively, abut feet 4b and 13b of levers 4 and 13, will be referred to again below when the mechanism shown in FIGURE 2 is described. However, attention is called at this time to the fact that in the mechanism illustrated in FIGURE 1, a groove 20a is provided in lens unit 20 to permit rod 3 to move freely within the lens unit structure, and rod 2 is not long enough to contact the surface of interchangeable lens unit 20.

Therefore, whenever the camera operator attaches an interchangeable lens unit having no separate diaphragm means, lever 13 and rod 2 perform no necessary function, and lever 4 is moved only by the adjustment of diaphragm setting member 1 as follow-up member 4a rides on cam 1a.

FIGURE 2 shows the same lever mechanism for rotating measuring instrument 11 as is illustrated in FIGURE 1. In FIGURE 2, however, interchangeable lens unit 30 is of the type having a separate diaphragm which may be adjusted by setting member 31. A cam surface 31a moves with and is positioned in accordance with the adjustment of diaphragm setting member 31.

Lens unit 30 also includes a cam 30a adapted to make contact with rod 2. Upon attachment of lens unit 30 to the camera, the contact of cam 30a with rod 2 causes lever 4 to be rotated about axle 6. Lever means 5 follows this action, moving rack 8 in the assumed initial direction shown by arrow A. Lever means 13 moves with rack 8, pivoting about axle 14 and causing push rod 3 to move into contact with cam surface 31a.

When rod 3 makes solid contact with cam 31a, further movemnt of lever 13 is prevented, and the movement of rack 8 and lever 5 in direction A is also stopped. However, spring 7 permits lever 4 to continue its movement away from follower 5a of lever 5 until follow-up member 4a of lever 4 is positioned away from possible contact with cam surface 1a of camera-diaphragm setting member 1, which moves, by means not shown, to open the camera diaphragm to its maximum aperture.

Therefore, when lens unit 30 (which includes a separate diaphragm means) is interconnected with the camera housing, rotation of measuring instrument 11 is carried out solely by diaphragm setting member 31 and its cam surface 31a acting on lever means 14 via rod 3. Spring 7 provides the tension necessary to have rod 3 maintain contact with cam 31a through its extremes of travel.

It can be seen that according to the invention herein, lens units including lenses of different focal lengths and with or without separate diaphragm means may be interchangeably mounted within the camera, and the lens aperture will be adjusted to the proper size in accordance with the prevailing intensity of scene illumination as the operator matches pointer 11a with index mark 12 by adjusting the position of appropriate diaphragm setting members 1 or 31.

This invention has been described in detail with particular reference to a preferred embodiment thereof, but it will be understood that variations and modifications may be effected within the scope and spirit of the invention as described hereinabove and as defined in the appended claims.

I claim:

1. In a camera and interchangeable lens unit combination, the camera including exposure control mechanism having a movable element positionable as a function of scene brightness and a camera-diaphragm setting member for controlling the amount of light received by the camera, said setting member being normally interconnected with said movable element to correlate the operation of said setting member and the position of said movable element, and the lens unit including a lens system and a lens-unit-diaphragm setting member adjustable to control the amount of light passing through said lens system, the improvement comprising: coupling means interconnected with said movable element and responsive to the position of the lens-unit-diaphragm setting member when the lens unit is attached to the camera for correlating the adjustment of the lens-unit-diaphragm setting member and the position of said movable element, whereby the amount of light received by the camera through the lens unit is controlled by the lens-unit-diaphragm setting member as a function of scene brightness.

2. The apparatus according to claim 1 wherein said coupling means includes a cam follower which contacts a cam surface on the lens-unit-diaphragm setting member when the unit and camera are attached.

3. The apparatus according to claim 1 further comprising: second coupling means for disabling the normal interconnection between said movable element and the camera-diaphragm setting member.

4. The apparatus according to claim 3 wherein the camera's exposure control mechanism also includes a translatable means, and the camera-diaphragm setting means is normally interconnected to the translatable means by two members resiliently biased together for conjoint movement, said second coupling means overcoming the biasing force when the lens unit is attached to the camera to permit said interconnecting members to move independently.

5. The apparatus according to claim 3 wherein the camera-diaphragm setting member is interconnected with said movable element through cam and cam follower means, and said second coupling means includes a member for moving the cam follower out of contact with the cam.

6. The apparatus according to claim 4 wherein said first coupling means includes a member interconnected with the translatable means and movable in response to the adjustment of the lens-unit-diaphragm setting member.

7. The apparatus according to claim 4 wherein the two interconnecting members are levers movable about a common axis.

References Cited

UNITED STATES PATENTS 3,332,329    7/1967    Singer _____ 95—44 XR
3,352,220    11/1967    Lang et al. _____ 95—64 XR NORTON ANSHER, *Primary Examiner.*

J. F. PETERS, *Assistant Examiner.*

UNITED STATES PATENT OFFICE
CERTIFICATE OF CORRECTION

Patent No. 3,394,644                      July 30, 1968

Helmut Ettischer

It is certified that error appears in the above identified patent and that said Letters Patent are hereby corrected as shown below:

In the heading to the printed specification, after line 6, insert -- Claims priority, application Germany, Dec. 10, 1964, K 54,758 --.

Signed and sealed this 10th day of February 1970.

(SEAL)
Attest:

Edward M. Fletcher, Jr.
Attesting Officer

WILLIAM E. SCHUYLER, JR.
Commissioner of Patents